United States Patent
Latif et al.

(10) Patent No.: US 11,393,361 B1
(45) Date of Patent: Jul. 19, 2022

(54) BRAILLE READER SYSTEM USING DEEP LEARNING FRAMEWORK

(71) Applicant: Prince Mohammad Bin Fahd University, Dhahran (SA)

(72) Inventors: Ghazanfar Latif, Dhahran (SA); Jaafar Alghazo, Dhahran (SA); Shurouq Alufaisan, Dhahran (SA); Wafa Albur, Dhahran (SA); Shaikha Alsedrah, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/668,964

(22) Filed: Feb. 10, 2022

Related U.S. Application Data

(60) Provisional application No. 63/288,224, filed on Dec. 10, 2021.

(51) Int. Cl.
*G09B 21/00* (2006.01)
(52) U.S. Cl.
CPC ......... *G09B 21/007* (2013.01); *G09B 21/006* (2013.01); *G09B 21/008* (2013.01)
(58) Field of Classification Search
None
See application file for complete search history.

(56) References Cited

U.S. PATENT DOCUMENTS

2018/0197433 A1* 7/2018 Tavares ................ G09B 21/007

FOREIGN PATENT DOCUMENTS

| CN | 110298236 A | 10/2019 |
| JP | 2011-70530 | 4/2011 |
| KR | 10-2007-0057351 | 6/2007 |

OTHER PUBLICATIONS

Agrawal, Leena,"Real-Time Braille to Speech Conversion", R.N.S. Institute of Technology, Bengaluru, 41st Series—Seminar and Exhibition of Student Project Programme, Aug. 2018 (accessed at: http://www.kscst.iisc.ernet.in/spp/41_series/SPP41S/ for description of Exhibition of article; and http://www.kscst.iisc.*
Nanayakkara, Suranga, "EyeRing: A Finger-worn Assistant", May 2012 (accessed at: https://www.sutd.edu.sg/cmsresource/idc/papers/2012_Eyering_A_Finger_Worn_Assistant.pdf).*
Alsalman, et al. ; A Deep Learning-Based Recognition Approach for the Conversion of Multilingual Braille Images ; Computers, Materials & Continua, vol. 67, No. 3 ; 2021 ; 18 Pages.

\* cited by examiner

*Primary Examiner* — James B Hull
(74) *Attorney, Agent, or Firm* — Oblon, McClelland, Maier & Neustadt, L.L.P.

(57) ABSTRACT

A device, method, and system for converting printed Braille dots to speech. A Braille image of the printed Braille dots is captured by a digital camera mounted on a 3D ring case. Data processing and one or more image recognition operations are performed by a microprocessor to match the Braille image to a textural character corresponding to the Braille image. The textural character is converted to an audio waveform. The audio waveform is transmitted to a speaker. The speaker generates a sound representative of a spoken word corresponding to the textural character.

17 Claims, 10 Drawing Sheets

BRAILLE READER SYSTEM USING DEEP LEARNING FRAMEWORK

CROSS-REFERENCE TO RELATED APPLICATIONS

The present application claims priority to U.S. Provisional Application No. 63/288,224, filed Dec. 10, 2021, the entire contents which is incorporated by reference herein in its entirety for all purposes.

BACKGROUND

Technical Field

The present disclosure is directed to a Braille reader system including a deep learning framework which converts printed Braille dots to speech.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Braille is a form of written language used by visually impaired persons to read a document consisting of raised dots. In Braille, characters or words are represented by patterns of raised dots that are felt with the fingertips. Braille script is comprised of Braille cells, each representing a character or a word. A Braille sheet is a paper embossed with raised dots that are arranged in Braille cells. A Braille cell is represented by a collection of 6 raised dots arranged in two columns of 3 dots each. Braille script may be presented on Braille paper, on a refreshable Braille display device with dots or round-tipped pins raised through holes in a flat surface, by a Braille input device, and on public notices and signboards.

Various computer vision and image processing techniques may be used to recognize the characters or words from scanned documents and images of Braille script and convert the recognized characters or words to speech. Such techniques may assist a visually disabled person, an instructor or trainer in reading the Braille scripts.

Various solutions have been developed in recent years for the recognition of Braille scripts. A contact type image sensor that can be worn on a finger and configured to superimpose multiple images obtained from the contact type image sensor to obtain a composited image, convert the composited image into a Braille pattern, and convert the Braille pattern into a corresponding voice was described in JP2011070530A, "Contact type image sensor and image recognition device", incorporated herein by reference in its entirety. However, this reference has a drawback that the contact type image sensor comes in contact with the Braille pattern instead of the finger of the user. This drawback may hinder the learning experience of the blind person, as the tactile feedback from touching the Braille dots serves to orient the hand towards the next Braille word.

A mobile communication terminal to convert Braille points into voice by taking a picture of Braille points through a camera and recognize the Braille image to output the Braille image as a voice was described in KR2007057351A, "Mobile communication terminal for converting Braille points into a voice, especially concerned with recognizing the Braille points to output the recognized Braille points as the voice", incorporated herein by reference in its entirety. However, it is difficult for a blind person to take a picture of the Braille pattern with a camera, as the individual cannot orient the camera without vision.

A semantic segmentation model trained by using a convolutional neural network and Braille images are input into the semantic segmentation model which obtains a semantic segmentation result diagram of the Braille image was described in CN110298236A, incorporated herein by reference in its entirety. However, this reference outputs images of the Braille pattern which are not readable by a blind person.

Further, a deep convolutional neural network (DCNN) model that takes pre-processed Braille images as input to recognize Braille cells has been proposed. (See: Abdulmalik Alsalman, Amani Alsalman, Abdu Gumaei, and Suheer Ali Al-Hadhrami, "A Deep Learning-Based Recognition Approach for the Conversion of Multilingual Braille Images", Article in Computers, Materials and Continua, March 2021, DOI: 10.32604/cmc.2021.015614, incorporated herein by reference in its entirety). However, this reference does not convert the Braille pattern to speech so is not useful for a blind person.

Each of the aforementioned references suffers from one or more drawbacks hindering their adoption. Accordingly, it is one object of the present disclosure to provide a Braille reader system to capture and process Braille images for real time recognition of characters and words corresponding to Braille cells sensed by a finger of a user, and outputs speech.

SUMMARY

In an exemplary embodiment, a system for converting printed Braille dots to speech is disclosed. The system includes a 3D ring case and a digital camera mounted in the 3D ring case. The digital camera is configured to capture a Braille image of the printed Braille dots. The system further includes a rechargeable battery and a speaker. The system further includes a microprocessor operatively connected to the rechargeable battery, the digital camera, and the speaker. The microprocessor is configured to perform data processing and one or more image recognition operations which match the Braille image to a textural character corresponding to the Braille image. The microprocessor is further configured to convert the textural character to an audio waveform and transmit the audio waveform to the speaker. The speaker is configured to receive the audio waveform and generate a sound representative of a spoken word corresponding to the textural character.

In another exemplary embodiment, a method for converting printed Braille dots to speech is disclosed. The method includes capturing a Braille image of the printed Braille dots. The method further includes matching the Braille image to a textural character corresponding to the Braille image. Data processing and one or more image recognition operations are performed to match the Braille image to the textural character. The method further includes converting the textural character to an audio waveform and transmitting the audio waveform to a speaker. The method further includes generating, by the speaker, a sound representative of a spoken word corresponding to the textural character.

In another exemplary embodiment, a method for converting printed Braille dots to speech is disclosed. The method includes directing a lens of a digital camera towards Braille text including printed Braille dots. The digital camera is confined in a 3D ring case. The method further includes compressing a push button to capture a Braille image of the printed Braille dots. The method further includes matching the Braille image to a textural character corresponding to the Braille image. A microprocessor is configured to perform data processing and one or more image recognition operations to match the Braille image to the textural character. The method further includes converting the textural character to an audio waveform and transmitting the audio waveform to a speaker. The method further includes generating, by the speaker, a sound representative of a spoken word corresponding to the textural character.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
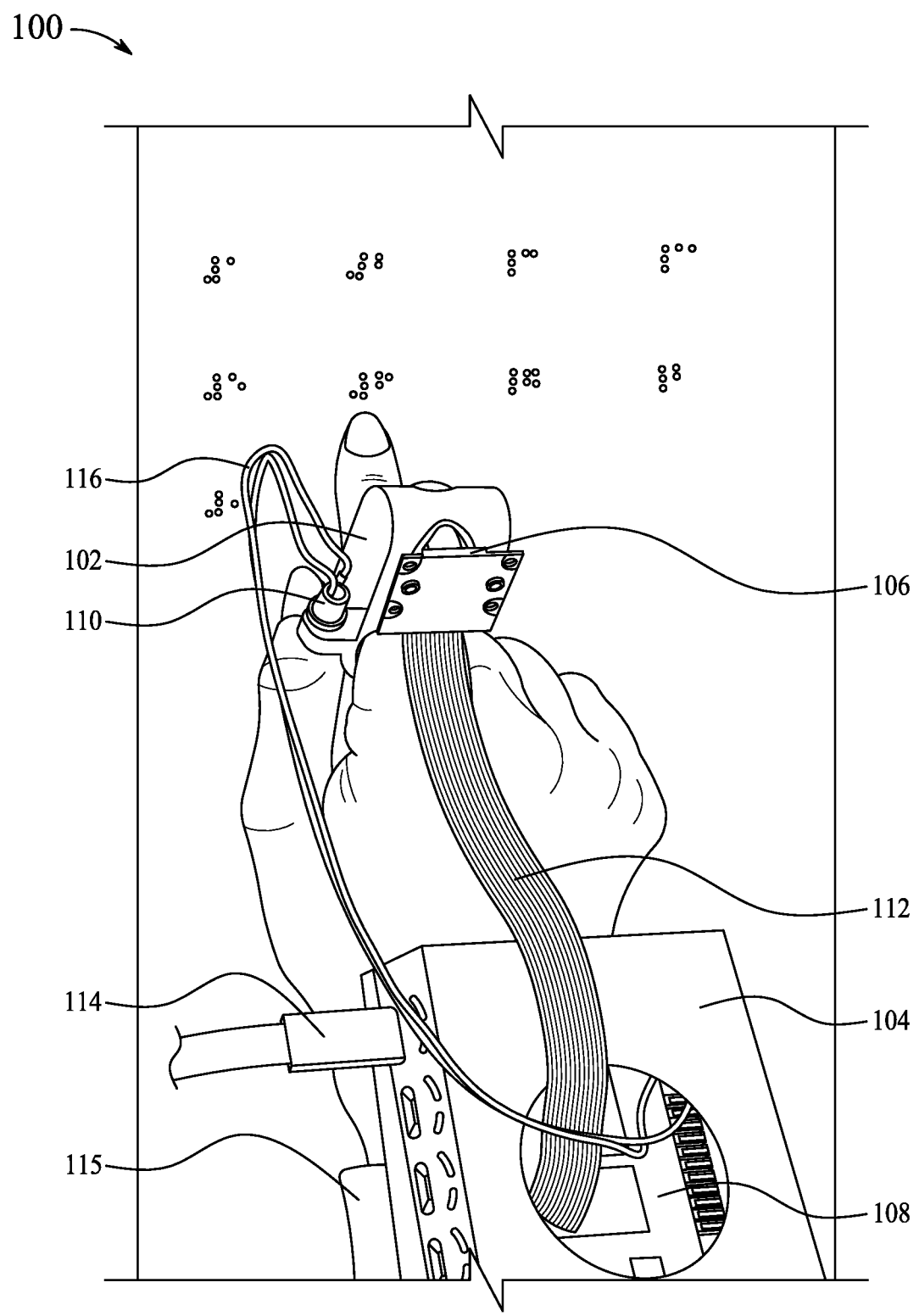
FIG. 1 is a schematic diagram of a Braille reading device, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for converting printed Braille dots to speech. The present disclosure discloses a device to be worn by a user. The device includes a camera to capture images of printed Braille dots. The device includes a microprocessor that processes the captured images of printed Braille dots to determine textural characters or words corresponding to the images of printed Braille dots.

FIG. 1 depicts a schematic diagram of a Braille reading device 100 for reading Braille scripts, according to exemplary aspects of the present disclosure.

According to aspects of the present disclosure, the Braille reading device 100 includes a three-dimensional (3D) ring case 102, a microprocessor housing 104, a digital camera 106, a microprocessor board 108, a switch 110, a flexible flat cable (FFC) 112, a speaker 114, a strap 115, and a pair of connecting wires 116.

Figure 2:
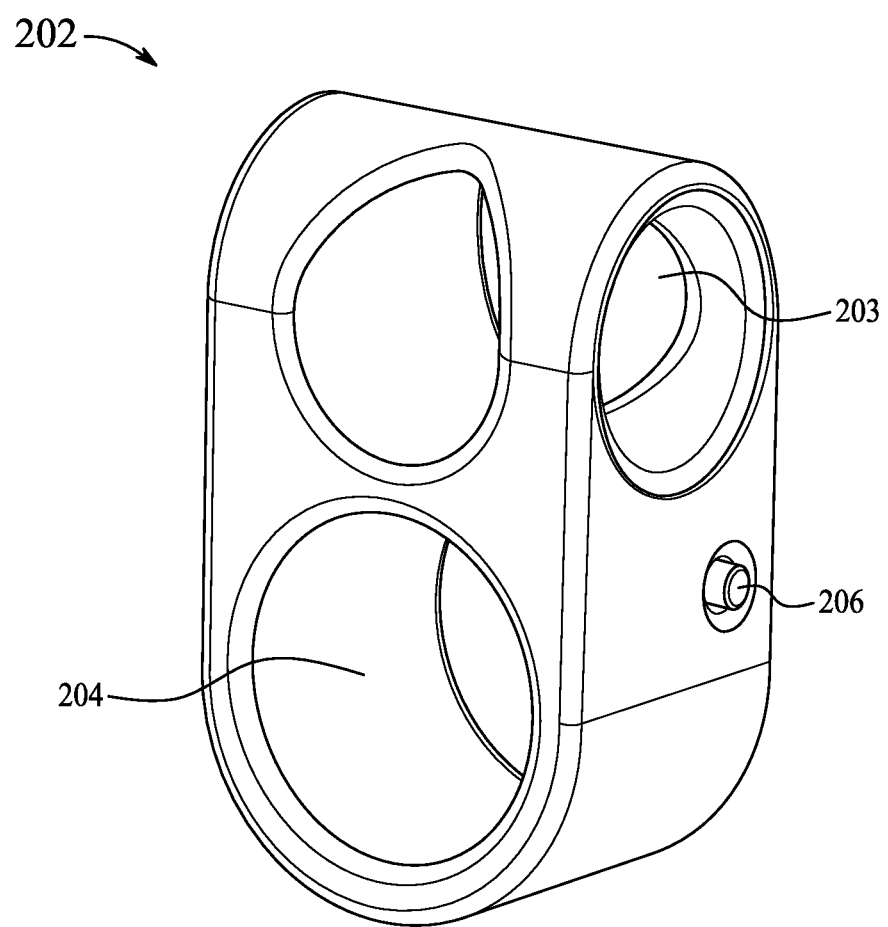
FIG. 2 is a schematic diagram of a 3D ring case, according to certain embodiments.

Referring to FIG. 2, the 3D ring case 102 includes a first ring 203 and a second ring 204. The second ring is positioned below the first ring. The digital camera 106 is arranged in the first ring. The 3D ring case 102 is worn on a finger of a user by inserting the finger of the user in the second ring. The switch 110 is arranged on the 3D ring case 102. The 3D ring case 102 is explained in further detail with reference to FIG. 2.

Figure 3A:
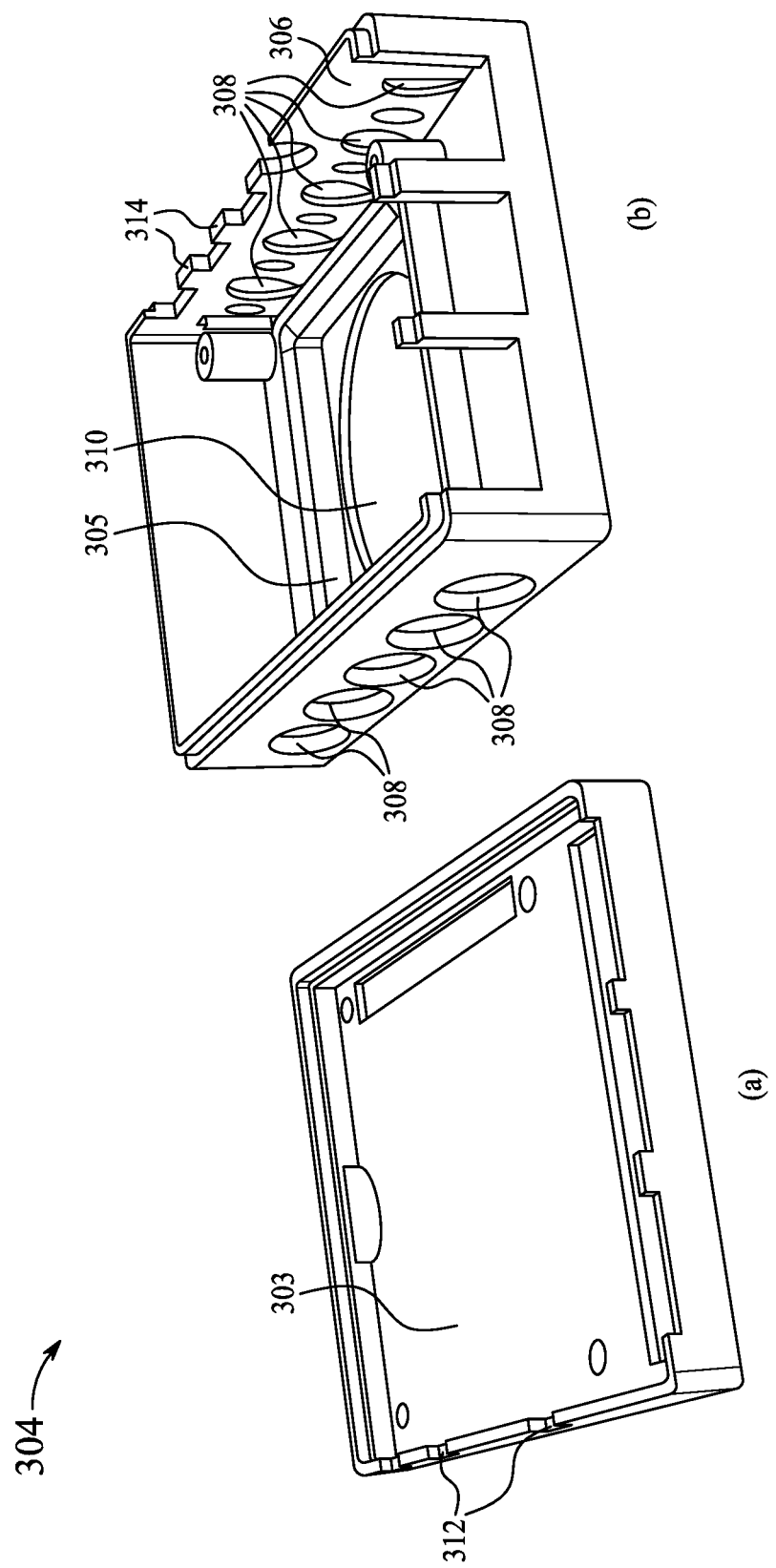
FIG. 3A is a schematic diagram of a microprocessor housing, where (a) is a base and (b) is a lid of the microprocessor housing, according to certain embodiments.

Referring to FIG. 1 and FIG. 3A, the microprocessor housing 104 may include a base 303 and a lid 305. The base holds the microprocessor board 108. The lid may be placed on top of the base to enclose components arranged on the base. A top side of the lid includes a cut-out portion to receive the FFC 112. The microprocessor board 108, enclosed in the microprocessor housing 104, is connected to the digital camera 106 by the FFC 112 passing through the cut-out portion. The base includes the strap 115 (shown as 315, FIG. 3B) for the user to wear the microprocessor housing 104 on the wrist of the user. The lid further includes another cut-out portion on a sidewall (or a lateral side) to hold the speaker 114. In an aspect of the present disclosure, the speaker 114 may be arranged within the microprocessor housing 104. The microprocessor housing 104 is explained in further detail with reference to FIG. 3A and FIG. 3B.

Referring back to FIG. 1, the Braille reading device 100 further includes a battery (not shown) to power one or more of the digital camera 106, the microprocessor board 108, and the speaker 114. The battery may be arranged in the microprocessor housing 104. In an aspect of the present disclosure, the battery may be a rechargeable battery. The microprocessor housing 104 may include a power interface that may be connected to a power charging adapter to charge the rechargeable battery. In an aspect of the present disclosure, the battery may be replaced with a new battery when the battery runs out of power.

In an aspect of the present disclosure, the speaker 114 may be an external speaker or a headphone that may connect to the microprocessor board 108 via one or more audio interfaces. The one or more audio interfaces may include a wired audio interface or a wireless audio interface. The wired audio interface may include high definition multimedia interface (HDMI), a 3.5 mm audio jack, and a universal serial bus (USB) interface. The wireless audio interface may include Bluetooth or Wireless Fidelity (Wi-Fi) connection. The speaker 114 may be powered by the battery of the Braille reading device 100, by an in-built battery in the speaker 114, or an external AC or DC power supply.

The pair of connecting wires 116 connects the switch 110 to the microprocessor board 108. The pair of connecting wires 116 passes through the cut-out portion on the top side of the lid to connect the switch 110 to the microprocessor board 108 enclosed in the microprocessor housing 104. In an aspect of the present disclosure, the microprocessor board 108 may include General-Purpose Input/Output (GPIO)

pins. The GPIO pins provide a physical interface between the microprocessor board 108 and external components. One end of the pair of connecting wires 116 is connected to the switch 110, and the other end of the pair of connecting wires 116 is connected to the GPIO pins. The switch 110 activates the Braille reading device 100.

In operation, the user may wear the 3D ring case 102 on a finger of either hand and wear the microprocessor housing 104 on the wrist of the same hand. To read or learn Braille script, the user may scan the Braille script by sensing printed Braille dots with the finger. The user may press the switch 110 to activate the Braille reading device 100 to identify one or more characters or words corresponding to the printed Braille dots sensed by the finger. When the user presses the switch 110, the digital camera 106 captures a Braille image of the Braille dots. The Braille image is transmitted to the microprocessor board 108 over the FFC 112. The microprocessor board 108 comprises a microprocessor that performs one or more image processing techniques or algorithms to process the Braille image for image recognition. Further, the microprocessor may input the processed Braille image to a trained deep learning based convolutional neural network (CNN) model. The trained deep learning based CNN model is trained on a dataset of images of Braille scripts. The trained deep learning based CNN model accepts the processed Braille image, extract features from the processed Braille image, and classifies them into respective classes to recognize one or more characters or words corresponding to the Braille image. The microprocessor generates an audio waveform corresponding to the recognized characters or words and transmits the audio waveform to the speaker 114. The speaker 114 outputs the sound corresponding to the audio waveform.

In a non-limiting example, the microprocessor board 108 may be one of a Raspberry Pi series or other similar single-board computers. The microprocessor board 108 may include the processor, the GPIO pins to provide a physical interface between the microprocessor board 108 and external components, memory module such as a random access memory (RAM), one or more HDMI ports, camera serial interface (CSI) to connect the digital camera 106 through the FFC 112, one or more USB ports to connect peripheral devices and power supply, one or more micro USB ports, and one or more wireless connectivity modules, such as Bluetooth and Wi-Fi and secure digital (SD) card slot.

In an aspect of the present disclosure, the Braille reading device 100 may be communication-enabled using various wired and wireless connectivity protocols, such as Wi-Fi and Personal Area Network. The processor of the Braille reading device 100 may load the trained deep learning based CNN model from a host machine or a server.

FIG. 2 depicts a schematic diagram of a 3D ring case 202, according to exemplary aspects of the present disclosure.

According to aspects of the present disclosure the 3D ring case 202 is designed to be worn on a finger of the user and to accommodate the digital camera 106 and the switch 110. The 3D ring case 202 corresponds to the 3D ring case 102 of FIG. 1. The 3D ring case 202 includes a first opening 203, a second opening 204 below the first opening 203, and a switch 206. The digital camera 106 may be arranged in the first opening 203. The 3D ring case 202 may be worn on a finger of the user by inserting the finger of the user in the second opening 204. The switch 206 may be arranged on either of the lateral sides of the 3D ring case 202.

Although the first opening 203 and the second opening 204 as shown in FIG. 2 are round in shape, one or both the first opening 203 and the second opening 204 may be of any other shape depending on design requirements. For example, shape and size of the first opening 203 may be designed based on shape and size of the digital camera 106 to be arranged in the first opening 203.

In an aspect of the present disclosure, the 3D ring case 202 may be custom designed to provide a slot, in place of the switch 206, for accommodating the switch 110 on the 3D ring case 202. The 3D ring case 202 may be custom designed to have dimensions in accordance with requirements and components of Braille reading device 100. In an aspect of the present disclosure, the 3D ring case 202 may be printed by a 3D printer.

In an aspect of the present disclosure, the 3D ring case 202 may be designed in a plurality of sizes for the second opening 204. In a non-limiting example, the 3D ring case 202 may be designed for three different sizes, i.e., small, medium, and large size of the second opening 204, which can be selected to fit a finger size of a user. In an aspect of the present disclosure, the 3D ring case 202 may be designed such that size of the second opening 204 may be adjusted to fit size of the finger of the user. In an aspect of the present disclosure, the 3D ring case 202 may be custom designed in accordance with physical appearance preferences of different users.

FIG. 3A depicts a schematic diagram of a microprocessor housing 304, where (a) is a base and (b) is a lid of the microprocessor housing, according to exemplary aspects of the present disclosure.

Figure 3B:
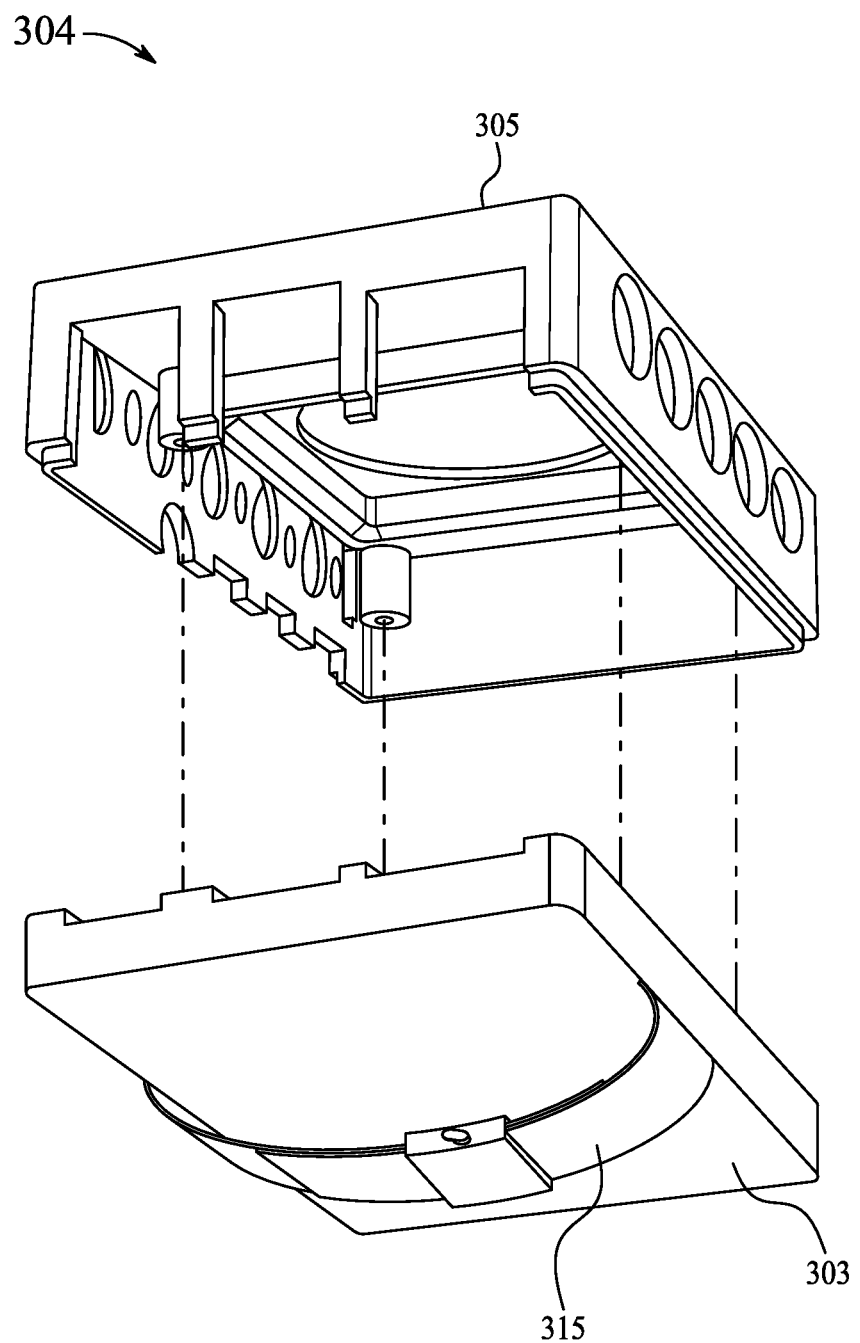
FIG. 3B is a schematic diagram of a microprocessor housing, according to certain embodiments.

According to aspects of the present disclosure the microprocessor housing 304 is designed to accommodate the microprocessor board 108, the speaker 114, and the battery. The microprocessor housing 304 corresponds to the microprocessor housing 104 of FIG. 1. The microprocessor housing 300 includes a base 303 and a lid 305. The base 303 is designed to hold the microprocessor board 108 and the battery. The base 303 includes a strap 315. The strap 315 is used to wear the microprocessor housing 304 on a wrist of the user as shown in FIG. 3B.

The lid 305 includes a plurality of cutout portions 308 on sidewalls 306 (or lateral sides). The plurality of cut-out portions 308 may enable air flow in the microprocessor housing 304. At least one of the plurality of cut-out portions 308 is used to arrange the speaker 114. A top side of the lid 305 includes a cut-out portion 310. The FFC 112 passes through the cut-out portion 310 to connect the digital camera 106 to the microprocessor board 108.

The base 303 further includes a plurality of slots 312 and the sidewalls 306 include a plurality of tabs 314. Each tab 314 aligns with a corresponding slot 312 when the lid 305 and the base 303 are joined together.

Although the plurality of cut-out portions 308 and the cut-out portion 310 as shown in FIG. 3A are round in shape, the plurality of cut-out portions 308 and the cut-out portion 310 may be of any other shape depending on design requirements.

FIG. 3B depicts a schematic diagram of a microprocessor housing 304, according to exemplary aspects of the present disclosure. The base 303 includes the strap 315. In an aspect of the present disclosure, the strap 315 may be an elastic band which may be worn on the wrist of the user by stretching the elastic band and slipping (or sliding) the hand through the elastic band. In another aspect of the present disclosure, the strap 315 may include a first elastic wristband connector and a second elastic wristband connector. The first elastic wristband connector and the second elastic wristband connector may be coupled together to wear the microprocessor housing 304 on a wrist of the user. In an aspect of the present disclosure, the base 303 may include coupling means, such as fasteners, hooks, clips, and buckles to couple the strap 315 with the base 303. The coupling means may be arranged on exterior sides or exterior bottom of the base 303. In an aspect of the present disclosure, the base 303 may include slots on opposite side and the strap 315 may pass through the slots.

In an aspect of the present disclosure, the microprocessor housing 304 may be custom designed to have dimensions in accordance with requirements and components of Braille reading device 100. In an aspect of the present disclosure, the microprocessor housing 304 may be printed by a 3D printer.

In an aspect of the present disclosure, the microprocessor housing 304 may be designed to have a slim profile such that the microprocessor housing 304 can be hidden under sleeve of garment worn by the user. In an aspect of the present disclosure, the microprocessor housing 304 may be designed in the shape of one or more cartoon characters, superhero characters, animals, or may be custom designed to any desired shape and size, so as to appeal to children learning Braille.

Figure 4:
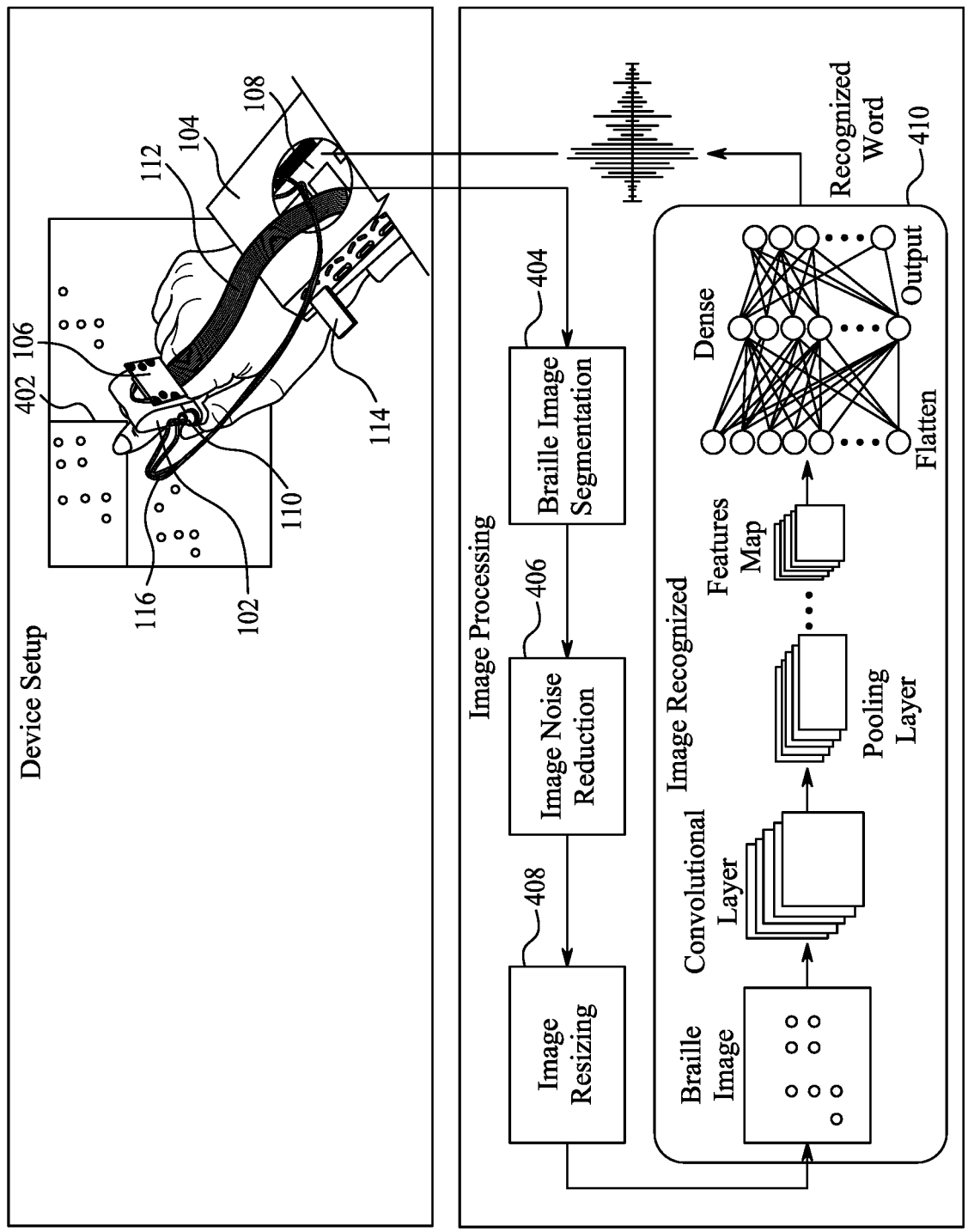
FIG. 4 is a process flow diagram illustrating a conversion of printed Braille dots to speech, according to certain embodiments.

FIG. 4 depicts a process flow diagram 400 illustrating conversion of Braille dots to speech, according to exemplary aspects of the present disclosure. As shown in FIG. 4, a user may wear the Braille reading device 100. The user may wear the microprocessor housing 104 on a wrist and the 3D ring case 102 on a finger. The user may scan a Braille script 402 with the finger to sense Braille dots. The Braille script 402 may be presented on one or more of: a Braille paper or textbook with printed dots, a refreshable Braille display device with dots or round-tipped pins raised through holes in a flat surface, a Braille input device, and public notices, bathroom doors, and signboards and the like.

In an aspect of the present disclosure, the user may wear the 3D ring case 102 on the index finger of a hand. For ease of operation, the user may press the switch 110 with the thumb of the same hand. In an aspect of the present disclosure, the user may wear the 3D ring case 102 in any finger on either hand, and use any finger on either hand to press the switch 110.

In an aspect of the present invention, the user may wear the 3D ring case 102 on the same finger with which the user senses the Braille dots. One or more of focal length, position, and optical angle of the digital camera 106 may be appropriately adjusted to capture images of the Braille dots sensed by the user.

By sensing the Braille dots with the finger, the user may identify the location of the Braille dots. After the user identifies the location of the Braille dots, the user actuates the digital camera 106. In an aspect of the present disclosure, after sensing the Braille dots, the user may move the finger behind the Braille dots such that the finger does not overlap the Braille dots and the Braille dots are in the field of view of the digital camera 106. In an aspect of the present disclosure, optical axis and/or field of view of the digital camera 106 may be oriented to capture Braille images of the Braille dots in one or more directions with respect to the finger of the user. The digital camera 106 may capture Braille images of the Braille dots above the finger and on the right and left side of the finger. In an aspect of the present disclosure, the microprocessor may be configured to adjust the optical axis and/or field of view of the digital camera 106 based on user preferences. In an aspect of the present disclosure, the user may manually adjust the optical axis and/or field of view of the digital camera 106 by adjusting position and/or orientation of the digital camera 106 in the first opening 203.

The user presses the switch 110 to actuate the digital camera 106 to capture a Braille image of the Braille dots. The digital camera 106 transmits the Braille image to the microprocessor included in the microprocessor board 108 over the FFC 112.

In an aspect of the present disclosure, when the user presses the switch 110, the digital camera 106 may begin to capture the Braille images at predetermined time intervals. The user may press the switch 110 again to stop capturing the Braille images. The microprocessor may be configured to capture the Braille images at the predetermined time intervals. The predetermined time interval may be adjusted based on reading speed and/or proficiency of the user.

The microprocessor may apply one or more digital image processing and/or computer vision techniques or algorithms to process the Braille image. The Braille script 402 is comprised of a plurality of Braille cells, each representing a character or a word. A Braille cell is represented by a collection of 6 raised dots arranged in two columns, each having three dots. The Braille image captured by the digital camera 106 may include one or more Braille cells, each representing a character or a word.

The microprocessor processes the Braille image by applying an image segmentation process 404 to the Braille image. Applying the image segmentation process 404 to the Braille image segments the Braille image into a plurality of segments. The plurality of segments in the segmented Braille image distinguishes individual Braille cells in the Braille image. The image segmentation process 404 may also distinguish the Braille cells from the background in the captured Braille image. In an aspect of the present disclosure, one or more image segmentation algorithms may be used to distinguish the Braille cells from the background and to distinguish individual Braille cells across a single line and/or multiple lines in the Braille image.

The microprocessor may further process the Braille image by applying an image noise reduction process 406 to the segmented Braille image. The quality of the Braille image captured by the digital camera 106 may be degraded due to various factors, such as a non-uniform ambient illumination, a low resolution imaging sensor, and an impulse noise. The image noise reduction process 406 may apply one or more image enhancement and denoising techniques to remove noise and enhance the quality of the segmented Braille image. The output of the image noise reduction process 406 is a denoised segmented Braille image.

The microprocessor may further process the Braille image by applying an image resizing process 408 to the denoised segmented Braille image. The plurality of segments in the denoised segmented Braille image may be appropriately resized for recognition of character or word corresponding to each of the plurality of Braille cells. One or more image interpolation and resizing techniques may be used to resize the plurality of denoised segments in the Braille image to generate a resized Braille image.

The microprocessor performs an image recognition process 410 on the resized Braille image. To perform the image recognition process 410, the resized Braille image is input to the trained deep learning based CNN model. The image recognition process 410 is performed to recognize characters or words corresponding to each of the plurality of Braille cells, i.e., the plurality of segments.

In an aspect of the present disclosure, the deep learning based CNN model may be trained on a dataset of Braille scripts. The dataset of Braille scripts which train the deep learning based CNN model may include a plurality of labeled images of Braille scripts in one or more languages. The plurality of labeled images of Braille scripts may include alphabets, numerals, and text. For example, dataset of Braille scripts may include one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet and English text. The plurality of labeled images of Braille scripts generates a plurality of Braille script recognition classes. The dataset of Braille scripts is not limited to English or Arabic and may also include numerals, alphabet and text in any language in which Braille is used.

The resized Braille image is input to the trained deep learning based CNN model to recognize characters or words corresponding to the Braille image. The trained deep learning based CNN model is a sequence of convolutional layer and pooling layer. The important features of the Braille image are kept in the convolution layers and intensified in the pooling layers and kept over the network, while discarding all the unnecessary information. The convolutional layers and pooling layers are consecutively connected to extract features of the resized Braille image to generate a features map. A flattening function may then be applied to the features map. The flattened features map may be passed through a neural network of fully connected layers or dense layers followed by an output layer. In the output layer, the Braille script recognition class is determined for the resized Braille image input to the trained deep learning based CNN model. The image recognition is complete, and the text corresponding to the captured Braille image is determined.

The processor may generate or extract an audio waveform of the text corresponding to the captured Braille image and transmit the audio waveform to the speaker 114. The speaker 114 may generate a sound corresponding to the audio waveform of the text corresponding to the captured Braille image. In an aspect of the present disclosure, the microprocessor may be configured to change the sound corresponding to the audio waveform. For example, the user may select the sound to be a man's voice, a woman's voice, a child's voice, a cartoon character's voice, and any other voice from a selection of voice options.

In an aspect of the present disclosure, the microprocessor may connect to a computing device, such as a mobile phone or a server computing device to configure the sound of the Braille reading device 100. In an aspect of the present disclosure, the Braille reading device 100 may pair with a mobile computing device running an application corresponding to the Braille reading device 100. The user may adjust one or more configurations of the Braille reading device 100 via the application running on the mobile computing device. In an aspect of the present disclosure, the application may provide a user interface to present the learning progress of the user.

In an aspect display of the present disclosure, a display device may be connected to the digital camera 106. At least one of a written text or a picture representative of the text corresponding to the captured Braille image may be displayed on the display device.

In an aspect of the present disclosure, the trained deep learning based CNN model may be implemented using open source Python libraries, such as TensorFlow, Keras, NumPy, and OpenCV.

In an aspect of the present disclosure, the microprocessor may be configured to run a programming code written in a programming language, such as R and Python. Running the programming code may cause the microprocessor to run the deep learning based CNN model to start the recognition process of the captured Braille image, and play an audio representation of the recognized text corresponding to the captured Braille image. In an aspect of the present disclosure, the trained deep learning based CNN model may be programmed on a host machine and configured on the microprocessor. The microprocessor may connect with the host machine to receive any updates related to the trained deep learning based CNN model and/or digital image processing.

Aspects of the present disclosure may enable a user, such as a visually impaired person or any other person reading or learning the Braille script to understand Braille scripts without assistance of a trainer. The user may sense the Braille dots and activate the digital camera 106 to capture the Braille image. The processor may process the captured Braille image and access the trained deep learning based CNN model to recognize text corresponding to the Braille image. Sounds of the recognized text may be played by the speaker 114 and/or displayed on a display screen. Thus, the Braille reading device 100 of the present disclosure provides real-time learning experience for the user with minimal or no assistance.

In an aspect of the present disclosure, the deep learning based CNN model may be trained on a dataset of Arabic braille numerals, alphabet, and text. Approximately 50,500 images may be collected for the dataset consisting of 10 classes for numerals, 28 classes for alphabet, and 60 classes of words in the Arabic language. Similar concept for training the deep learning based CNN model may be applied for other languages, thus, making the Braille reading device 100 compatible with any other language. The microprocessor may load the trained deep learning based CNN model for any other language to recognize text corresponding to Braille in that language.

Figure 5:
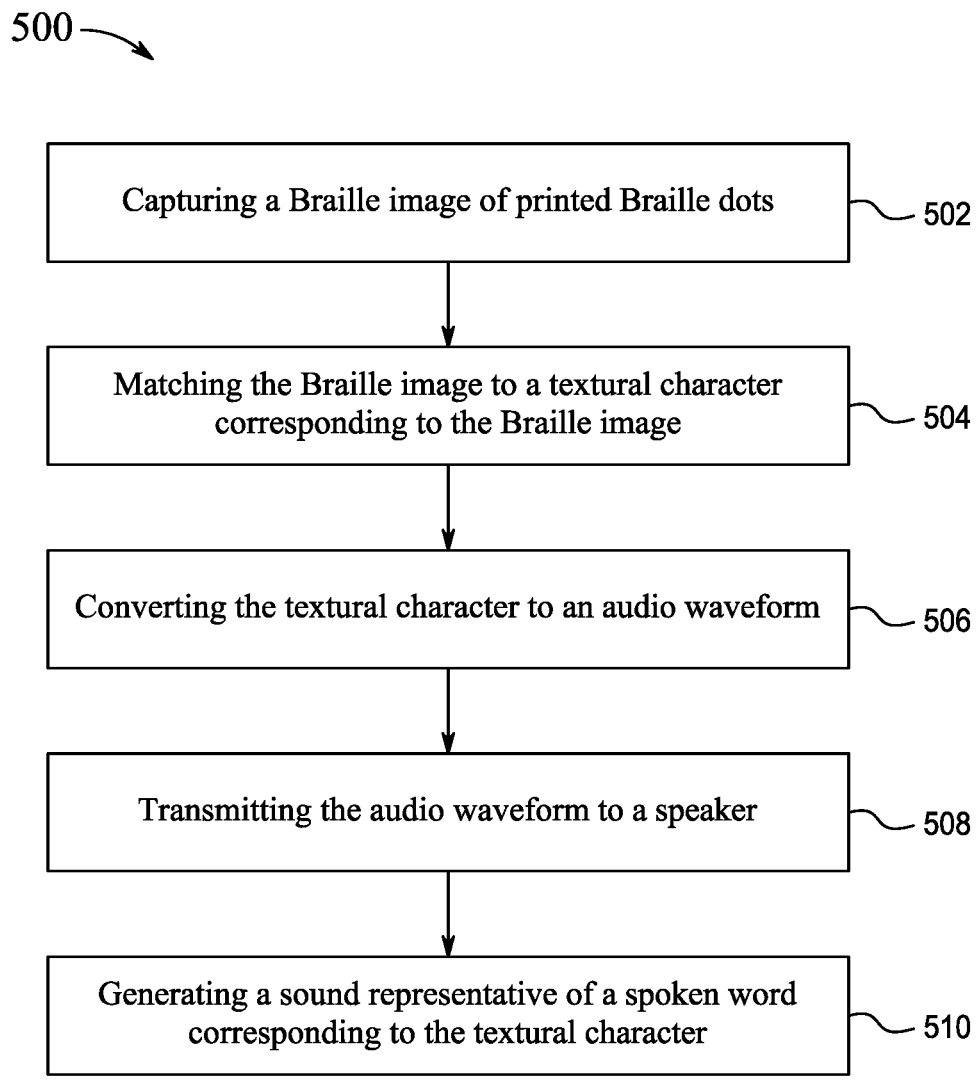
FIG. 5 is an exemplary process flow of a method for converting printed Braille dots to speech, according to certain embodiments.

FIG. 5 shows an exemplary process flow 500 of the present invention illustrating a method for converting printed Braille dots to speech, according to exemplary aspects of the present disclosure.

At step 502, the method includes capturing a Braille image of the printed Braille dots.

At step 504, the method includes matching the Braille image to a textural character corresponding to the Braille image. Data processing and one or more image recognition operations may be performed to match the Braille image to the textural character.

At step 506, the method includes converting the textural character to an audio waveform.

At step 508, the method includes transmitting the audio waveform to the speaker 114.

At step 510, the method includes generating a sound representative of a spoken word corresponding to the textural character. The speaker 114 generates the sound representative of the spoken word.

Figure 6:
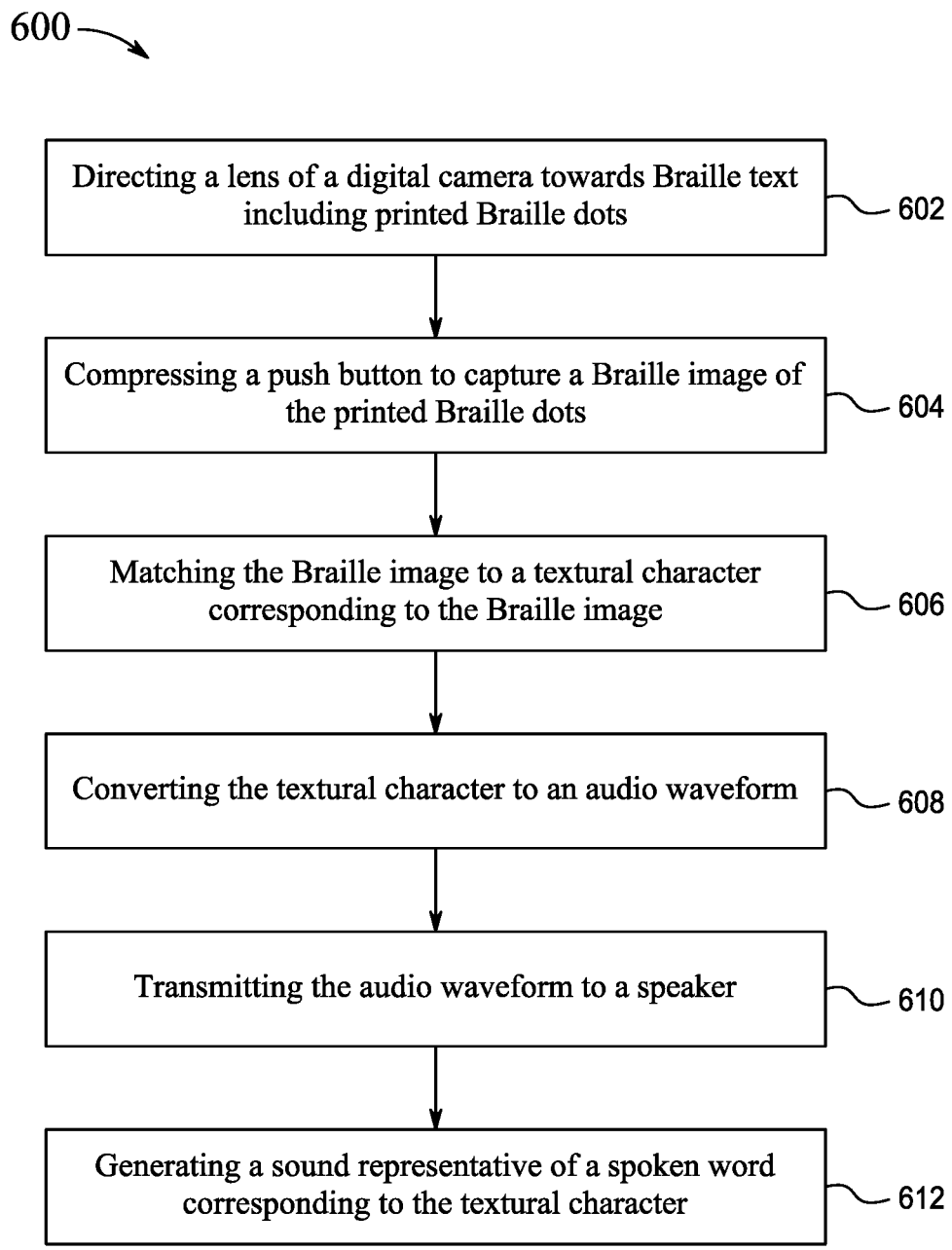
FIG. 6 is an exemplary process flow of a method for converting printed Braille dots to speech, according to certain embodiments.

FIG. 6 shows an exemplary process flow 600 of the present invention illustrating a method for converting printed Braille dots to speech, according to exemplary aspects of the present disclosure.

At step 602, the method includes directing a lens of the digital camera 106 towards Braille text including printed Braille dots. The digital camera is confined in the 3D ring case 102.

At step 604, the method includes compressing the switch 110 to capture a Braille image of the printed Braille dots.

At step 606, the method includes matching the Braille image to a textural character corresponding to the Braille image. The microprocessor is configured to perform data processing and one or more image recognition operations to match the Braille image to the textural character.

At step 608, the method includes converting the textural character to an audio waveform.

At step 610, the method includes transmitting the audio waveform to the speaker 114.

At step 612, the method includes generating a sound representative of a spoken word corresponding to the textural character. The speaker 114 generates the sound representative of the spoken word.

The first embodiment is illustrated with respect to FIGS. 1-9. The first embodiment describes a system for converting printed Braille dots to speech. The system comprises a 3D ring case 102, 200, a digital camera 106 mounted in the 3D ring case 102, 200, wherein the digital camera 106 is configured to capture a Braille image of the printed Braille dots, a rechargeable battery, a speaker 114, a microprocessor operatively connected to the rechargeable battery, the digital camera 106 and the speaker 114, the microprocessor configured to perform data processing and one or more image recognition operations which match the Braille image to a textural character corresponding to the Braille image, convert the textural character to an audio waveform, and transmit the audio waveform to the speaker 114, and wherein the speaker 114 is configured to receive the audio waveform and generate a sound representative of a spoken word corresponding to the textural character.

The printed Braille dots are configured to represent an Arabic Braille textural character and the speaker 114 is configured to output a sound representative of an Arabic spoken word.

The textural character is configured to include one or more letters, one or more numbers, or one or more words.

The one or more letters include an Arabic letter or an English letter, the one or more numbers include an Arabic number or an English number, and the one or more words include an Arabic word or an English word.

The system further comprises a display connected to the digital camera 106, wherein the display is configured to display one of a written word or a picture representative of the word corresponding to the Braille image.

The rechargeable battery is a lithium battery.

The digital camera 106 is connected to the microprocessor by a serial bus configured to transmit data signals representative of the Braille image from the digital camera 106 to the microprocessor.

The 3D ring case 102, 200 includes a first ring configured to receive the digital camera 106, a second ring configured to be worn on a finger of a user, wherein the second ring is arranged below the first ring, and a switch configured to actuate the digital camera 106 to capture the Braille image.

The system further comprises a microprocessor housing. The microprocessor housing includes a base configured to hold the microprocessor and the rechargeable battery, the base having a first elastic wristband connector and a second elastic wristband connector, a lid configured with sidewalls having a first plurality of cut outs configured for air flow and a second cut out configured to hold the speaker 114, wherein a top of the lid has a third cut out configured to receive the serial bus, and wherein the base includes a plurality of slots around its periphery and the sidewalls include a plurality of tabs, wherein each tab is configured to align with a respective slot when the lid and the base are joined together.

The system further comprises a serial bus port located on the microprocessor; a power port configured to connect the rechargeable battery to the microprocessor, a first output pin configured to connect to a first wire, wherein the first wire is connected to a power input of the push button switch, a second output pin configured to connect a second wire, wherein the second wire is connected to a power output of the digital camera 106, and a third output pin configured to connect to the speaker 114.

The microprocessor is configured to perform the data processing by segmenting the Braille image into a plurality of segments, reducing image noise from the plurality of segments to generate a plurality of denoised segments, and resizing the plurality of denoised segments to generate a plurality of resized denoised segments.

The microprocessor is configured to perform one or more image recognition operations on the plurality of resized denoised segments to match the Braille image to a textural character corresponding to the Braille image by: training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet and English text to generate a plurality of Braille script recognition classes; applying the plurality of resized denoised segments to the deep learning based convolutional neural network, matching each of the plurality of resized denoised segments to a Braille script recognition class, and retrieving the audio waveform associated with the Braille script recognition class.

The second embodiment is illustrated with respect to FIGS. 1-9. The second embodiment describes a method for converting printed Braille dots to speech. The method comprising capturing a Braille image of the printed Braille dots, matching, by performing data processing and one or more image recognition operations, the Braille image to a textural character corresponding to the Braille image, converting the textural character to an audio waveform, transmitting the audio waveform to a speaker 114, and generating, by the speaker 114, a sound representative of a spoken word corresponding to the textural character.

The method further comprising segmenting the Braille image into a plurality of segments, reducing image noise from the plurality of segments to generate a plurality of denoised segments, and resizing the plurality of denoised segments to generate a plurality of resized denoised segments.

The method further comprising training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet and English text to generate a plurality of Braille script recognition classes; applying the plurality of resized denoised segments to the deep learning based convolutional neural network, and matching each of the plurality of resized denoised segments to a Braille script recognition class, and retrieving the audio waveform associated with the Braille script recognition class.

The third embodiment is illustrated with respect to FIGS. 1-9. The third embodiment describes a method for converting printed Braille dots to speech. The method comprising directing a lens of a digital camera 106 confined in a 3D ring case 102, 200 towards Braille text including printed Braille dots, compressing a push button to capture a Braille image of the printed Braille dots, matching, by a microprocessor configured to perform data processing and one or more image recognition operations, the Braille image to a textural character corresponding to the Braille image, converting the textural character to an audio waveform, transmitting the audio waveform to a speaker 114, and generating, by the speaker 114, a sound representative of a spoken word corresponding to the textural character.

The method further comprising segmenting the Braille image into a plurality of segments, reducing image noise from the plurality of segments to generate a plurality of denoised segments, and resizing the plurality of denoised segments to generate a plurality of resized denoised segments.

The method further comprising training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet and English text to generate a plurality of Braille script recognition classes, applying the plurality of resized denoised segments to the deep learning based convolutional neural network, matching each of the plurality of resized denoised segments to a Braille script recognition class, and retrieving the audio waveform associated with the Braille script recognition class.

The method further comprising transmitting, to the speaker, a sound representative of an Arabic spoken word corresponding to an Arabic textural character associated with Arabic Braille printed dots.

The method further comprising displaying, on the digital camera 106, one of a written word or a picture representative of the textural character corresponding to the Braille image.

Figure 7:
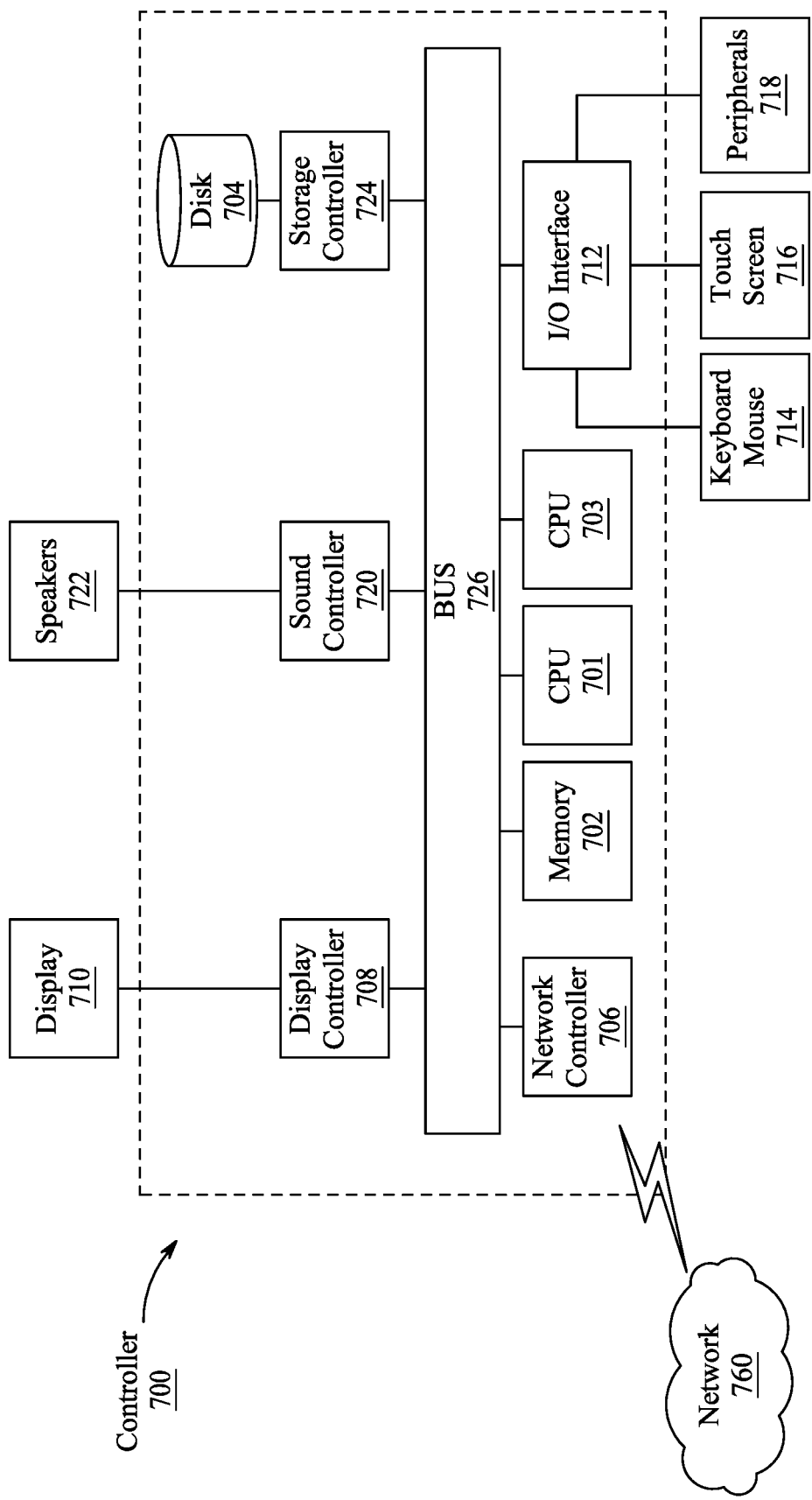
FIG. 7 is an illustration of a non-limiting example of details of computing hardware used in the computing system, according to certain embodiments.

FIG. 7 is an illustration of a non-limiting example of details of computing hardware used in the computing system, according to exemplary aspects of the present disclosure. In FIG. 7, a controller 700 is described is representative of the system 600 of FIG. 6 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
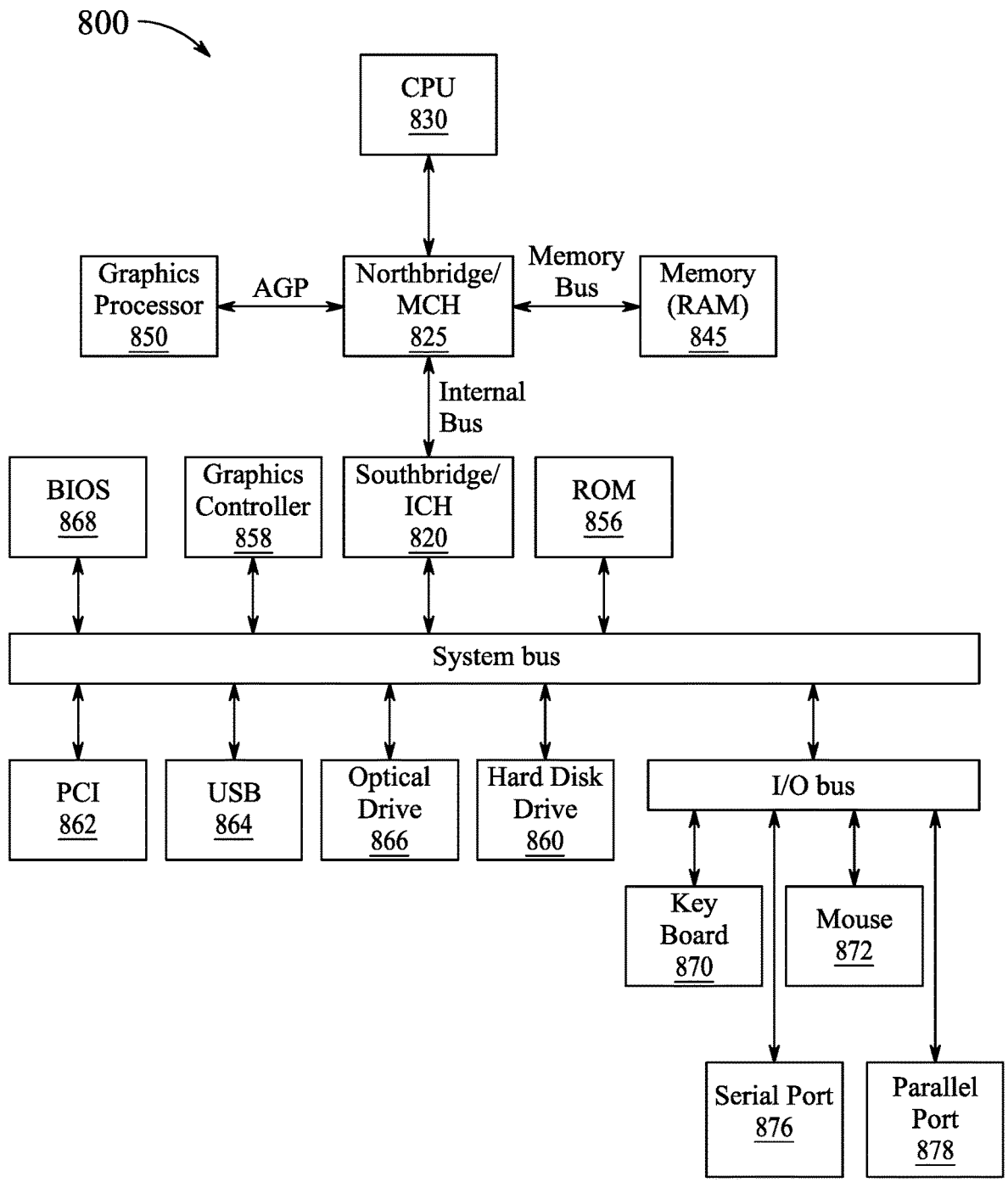
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
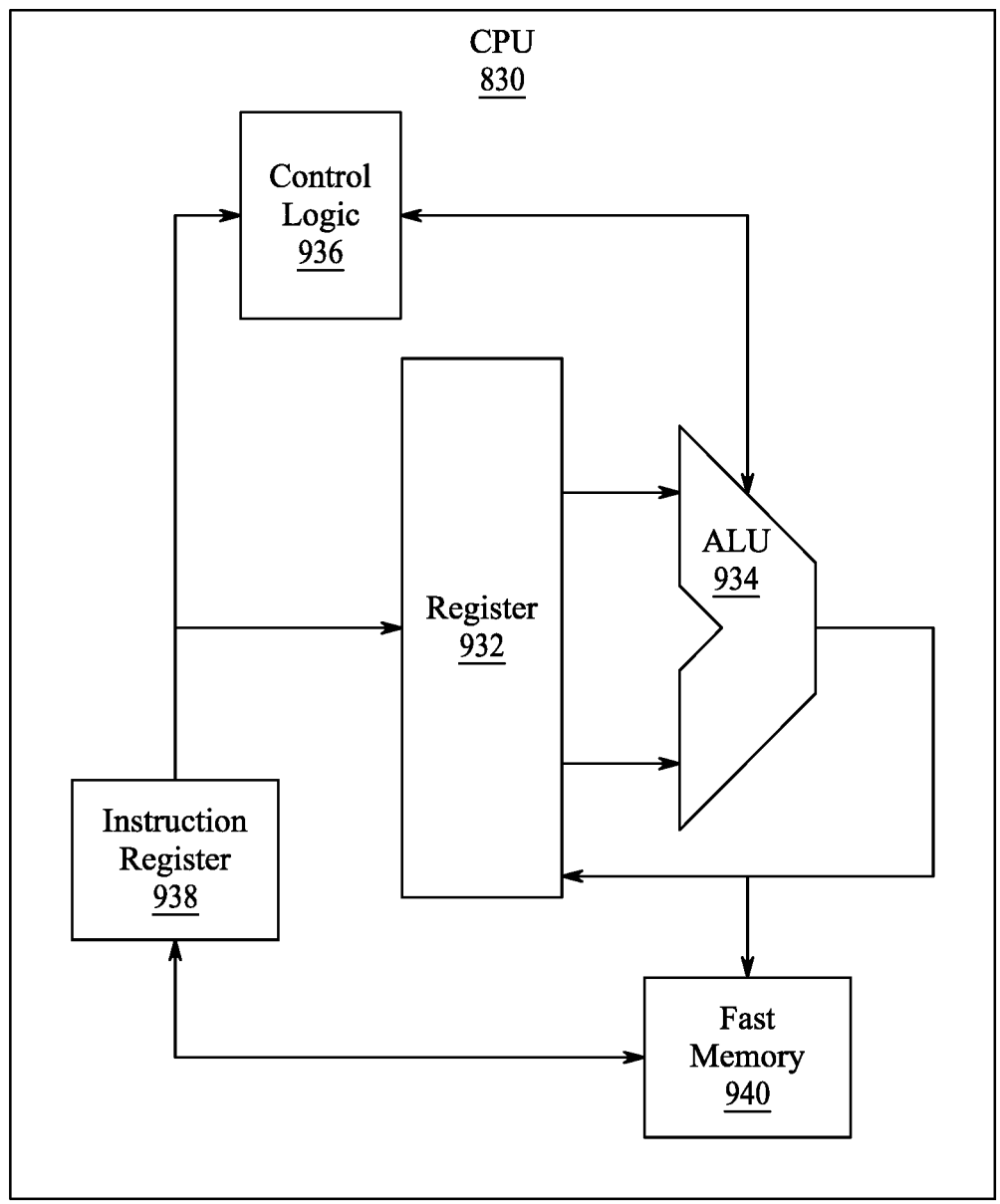
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for converting printed Braille dots to speech, the system comprising:
   a 3D ring case;
   a digital camera mounted in the 3D ring case, wherein the digital camera is configured to capture a Braille image of the printed Braille dots;
   a rechargeable battery;
   a speaker;
   a microprocessor operatively connected to the rechargeable battery, the digital camera and the speaker, the microprocessor configured to perform data processing and one or more image recognition operations which match the Braille image to a textural character corresponding to the Braille image, convert the textural character to an audio waveform, and transmit the audio waveform to the speaker;
   wherein the speaker is configured to receive the audio waveform and generate a sound representative of a spoken word corresponding to the textural character; and
   wherein the microprocessor is configured to perform the data processing by:
      segmenting the Braille image into a plurality of segments,
      reducing image noise from the plurality of segments to generate a plurality of denoised segments, and
      resizing the plurality of denoised segments to generate a plurality of resized denoised segments.

2. The system of claim 1, wherein the printed Braille dots are configured to represent an Arabic Braille textural character and the speaker is configured to output a sound representative of an Arabic spoken word.

3. The system of claim 1, wherein the textural character is configured to include one or more letters, one or more numbers, or one or more words.

4. The system of claim 3, wherein the one or more letters include an Arabic letter or an English letter, the one or more numbers include an Arabic number or an English number, and the one or more words include an Arabic word or an English word.

5. The system of claim 1, further comprising:
   a display connected to the digital camera, wherein the display is configured to display one of a written word or a picture representative of the word corresponding to the Braille image.

6. The system of claim 1, wherein the rechargeable battery is a lithium battery.

7. The system of claim 1, wherein the digital camera is connected to the microprocessor by a serial bus configured to transmit data signals representative of the Braille image from the digital camera to the microprocessor.

8. The system of claim 7, wherein the 3D ring case includes:
- a first ring configured to receive the digital camera;
- a second ring configured to be worn on a finger of a user, wherein the second ring is arranged below the first ring; and
- a switch configured to actuate the digital camera to capture the Braille image.

9. The system of claim 1, wherein the microprocessor is configured to perform one or more image recognition operations on the plurality of resized denoised segments to match the Braille image to a textural character corresponding to the Braille image by:
- training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet, and English text to generate a plurality of Braille script recognition classes;
- applying the plurality of resized denoised segments to the deep learning based convolutional neural network;
- matching each of the plurality of resized denoised segments to a Braille script recognition class; and
- retrieving the audio waveform associated with the Braille script recognition class.

10. A system for converting printed Braille dots to speech, the system comprising:
- a 3D ring case;
- a digital camera mounted in the 3D ring case, wherein the digital camera is configured to capture a Braille image of the printed Braille dots;
- a rechargeable battery;
- a speaker;
- a microprocessor operatively connected to the rechargeable battery, the digital camera and the speaker, the microprocessor configured to perform data processing and one or more image recognition operations which match the Braille image to a textural character corresponding to the Braille image, convert the textural character to an audio waveform, and transmit the audio waveform to the speaker; and
- a microprocessor housing, the microprocessor housing including:
  - a base configured to hold the microprocessor and the rechargeable battery, the base having a first elastic wristband connector and a second elastic wristband connector;
  - a lid configured with sidewalls having a first plurality of cut outs configured for air flow and a second cut out configured to hold the speaker, wherein a top of the lid has a third cut out configured to receive the serial bus; and
  - wherein the base includes a plurality of slots around its periphery and the sidewalls include a plurality of tabs, wherein each tab is configured to align with a respective slot when the lid and the base are joined together,
- wherein the speaker is configured to receive the audio waveform and generate a sound representative of a spoken word corresponding to the textural character;
- wherein the digital camera is connected to the microprocessor by a serial bus configured to transmit data signals representative of the Braille image from the digital camera to the microprocessor; and
- wherein the 3D ring case includes:
  - a first ring configured to receive the digital camera,
  - a second ring configured to be worn on a finger of a user, wherein the second ring is arranged below the first ring, and
  - a switch configured to actuate the digital camera to capture the Braille image.

11. The system of claim 10, further comprising:
- a serial bus port located on the microprocessor;
- a power port configured to connect the rechargeable battery to the microprocessor;
- a first output pin configured to connect to a first wire, wherein the first wire is connected to a power input of the push button switch;
- a second output pin configured to connect a second wire, wherein the second wire is connected to a power output of the digital camera; and
- a third output pin configured to connect to the speaker.

12. A method for converting printed Braille dots to speech, the method comprising:
- capturing a Braille image of the printed Braille dots;
- matching, by performing data processing and one or more image recognition operations, the Braille image to a textural character corresponding to the Braille image;
- converting the textural character to an audio waveform;
- transmitting the audio waveform to a speaker;
- generating, by the speaker, a sound representative of a spoken word corresponding to the textural character;
- segmenting the Braille image into a plurality of segments;
- reducing image noise from the plurality of segments to generate a plurality of denoised segments; and
- resizing the plurality of denoised segments to generate a plurality of resized denoised segments.

13. The method of claim 12, further comprising:
- training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet, and English text to generate a plurality of Braille script recognition classes;
- applying the plurality of resized denoised segments to the deep learning based convolutional neural network; and
- matching each of the plurality of resized denoised segments to a Braille script recognition class; and
- retrieving the audio waveform associated with the Braille script recognition class.

14. The method of claim 12, further comprising:
- training a deep learning based convolutional neural network on a dataset of Braille scripts, the Braille scripts including one or more of Arabic Braille numerals, Arabic Braille alphabet, Arabic Braille text, Arabic numerals, Arabic alphabet, Arabic text, English Braille numerals, English Braille alphabet, English Braille text, English numerals, English alphabet, and English text to generate a plurality of Braille script recognition classes;
- applying the plurality of resized denoised segments to the deep learning based convolutional neural network;
- matching each of the plurality of resized denoised segments to a Braille script recognition class; and
- retrieving the audio waveform associated with the Braille script recognition class.

15. The method of claim 14, further comprising:
transmitting, to the speaker, a sound representative of an Arabic spoken word corresponding to an Arabic textural character associated with Arabic Braille printed dots.

16. The method of claim 14, further comprising:
displaying, on the digital camera, one of a written word or a picture representative of the textural character corresponding to the Braille image.

17. A method for converting printed Braille dots to speech, the method comprising:
directing a lens of a digital camera confined in a 3D ring case towards Braille text including printed Braille dots;
compressing a push button to capture a Braille image of the printed Braille dots;
matching, by a microprocessor configured to perform data processing and one or more image recognition operations, the Braille image to a textural character corresponding to the Braille image;
converting the textural character to an audio waveform;
transmitting the audio waveform to a speaker;
generating, by the speaker, a sound representative of a spoken word corresponding to the textural character;
segmenting the Braille image into a plurality of segments;
reducing image noise from the plurality of segments to generate a plurality of denoised segments; and
resizing the plurality of denoised segments to generate a plurality of resized denoised segments.

* * * * *